United States Patent
Robertson et al.

(10) Patent No.: US 9,982,605 B2
(45) Date of Patent: May 29, 2018

(54) AUXILIARY COMPONENT MOUNT INCLUDING A FUSIBLE REGION CONFIGURED TO BREAK AT A PREDETERMINED LOAD

(71) Applicant: UNITED TECHNOLOGIES CORPORATION, Farmington, CT (US)

(72) Inventors: Thomas J. Robertson, Glastonbury, CT (US); Steven Clarkson, Cheshire, CT (US); Mark w. Costa, Storrs, CT (US)

(73) Assignee: UNITED TECHNOLOGIES CORPORATION, Farmington, CT (US)

( * ) Notice: Subject to any disclaimer, the term of this patent is extended or adjusted under 35 U.S.C. 154(b) by 531 days.

(21) Appl. No.: 14/410,487

(22) PCT Filed: Sep. 13, 2013

(86) PCT No.: PCT/US2013/059746
§ 371 (c)(1),
(2) Date: Dec. 22, 2014

(87) PCT Pub. No.: WO2014/081500
PCT Pub. Date: May 30, 2014

(65) Prior Publication Data
US 2016/0177840 A1    Jun. 23, 2016

Related U.S. Application Data

(60) Provisional application No. 61/706,848, filed on Sep. 28, 2012.

(51) Int. Cl.
*F01D 21/04* (2006.01)
*F02C 7/32* (2006.01)
*F02C 7/20* (2006.01)

(52) U.S. Cl.
CPC .............. *F02C 7/32* (2013.01); *F01D 21/045* (2013.01); *F02C 7/20* (2013.01); *F05D 2220/32* (2013.01);
(Continued)

(58) Field of Classification Search
CPC .... F02C 7/20; F02C 7/32; F01D 25/28; F01D 25/285; F01D 21/04; F01D 21/045; F05D 2240/90; F05D 2260/311
See application file for complete search history.

(56) References Cited

U.S. PATENT DOCUMENTS 5,417,501 A * 5/1995 Hyde .................... F01D 21/045
384/542
5,885,056 A    3/1999 Goodwin
(Continued)

FOREIGN PATENT DOCUMENTS

EP    1010878 A2    6/2000
EP    1382805 A2    1/2004
EP    1473441 A2    11/2004

OTHER PUBLICATIONS

European Search Report for Application No. 13856339.0-1607; dated Apr. 22, 2016; 6 pgs.
(Continued)

*Primary Examiner* — Laert Dounis
(74) *Attorney, Agent, or Firm* — Cantor Colburn LLP

(57) ABSTRACT

A mount for mounting a component to a gas turbine engine is disclosed. The mount may include a central portion that attaches to the component, and a flange circumscribing the central portion and extending to the gas turbine engine, the flange including a fusible region that breaks at a predetermined load. A method for protecting a component mounted to a gas turbine engine is also disclosed. The method may include attaching a mount to a casing of the gas turbine engine, the mount including a fusible region that breaks at
(Continued)

a predetermined load. The method may further include attaching the component to the mount. The method may further include the fusible region breaking when the mount experiences the predetermined load, detaching the component from the casing of the gas turbine engine.

16 Claims, 10 Drawing Sheets

(52) U.S. Cl.
CPC ...... *F05D 2240/90* (2013.01); *F05D 2260/30* (2013.01); *F05D 2260/311* (2013.01)

(56) References Cited

U.S. PATENT DOCUMENTS

| | | | |
|---|---|---|---|
| 6,170,252 B1 * | 1/2001 | Van Duyn | F01D 21/04 60/223 |
| 6,364,603 B1 | 4/2002 | Czachor et al. | |
| 6,398,259 B1 | 6/2002 | Palmer et al. | |
| 6,402,469 B1 | 6/2002 | Kastl et al. | |
| 6,447,248 B1 * | 9/2002 | Kastl | F01D 21/045 384/535 |
| 6,477,248 B1 | 9/2002 | Kastl et al. | |
| 6,715,646 B2 | 4/2004 | Bachmeyer et al. | |
| 6,779,294 B2 * | 8/2004 | Ames | A01K 91/047 43/43.12 |
| 7,360,986 B2 | 4/2008 | Hugonie et al. | |
| 8,104,736 B2 | 1/2012 | Callaghan | |
| 2004/0006967 A1 | 1/2004 | Clark | |
| 2005/0236241 A1 | 10/2005 | Dusserre-Telmon et al. | |
| 2007/0125087 A1 * | 6/2007 | Callaghan | F01D 21/045 60/772 |
| 2009/0272053 A1 * | 11/2009 | Dent | E02D 27/32 52/296 |
| 2012/0148392 A1 * | 6/2012 | Lussier | F01D 21/045 415/200 |
| 2014/0290271 A1 * | 10/2014 | Dalton | F02C 7/32 60/801 |

OTHER PUBLICATIONS

International Search Report and Written Opinion for related International Application No. PCT/US13/59746; report dated Jun. 27, 2014.

* cited by examiner

AUXILIARY COMPONENT MOUNT INCLUDING A FUSIBLE REGION CONFIGURED TO BREAK AT A PREDETERMINED LOAD

CROSS-REFERENCE TO RELATED APPLICATION

This application is a 35 U.S.C. § 371 U.S. National Stage filing of International Patent Application No. PCT/US13/59746 filed on Sep. 13, 2013, claiming priority to U.S. provisional Patent Application No. 61/706,848 filed on Sep. 28, 2012.

FIELD OF THE DISCLOSURE

The present disclosure relates generally to gas turbine engines and, more particularly, to an auxiliary component mount for a gas turbine engine.

BACKGROUND OF THE DISCLOSURE

Gas turbine engines typically utilize a turbine fan to draw ambient air into the engine for compression and combustion by the engine. The turbine fan is shrouded by an engine casing. Various auxiliary components, such as electrical boxes, engine oil tanks, gearboxes, valves, control systems for regulating the engine's operations, and other components, are mounted to the engine casing. Various mounting systems mount the auxiliary components to the engine casing.

Conventional mounting systems may become subjected to a high degree of shock loading not experienced during normal engine operating conditions. For example, a high shock load may result from a fan-blade out event, which occurs when a fan-blade breaks off of an engine rotor body. A fan-blade out event may also result in an imbalance in the engine rotor body which may cause outward deflection and a rotor body shaft imbalance. The mounting system may not be able to withstand the high shock load of a fan-blade out event, causing separation of the auxiliary components from the engine casing. Or, the mounting system may transfer the high shock load to the auxiliary components, causing damage to the auxiliary components.

Accordingly, there exists a need to provide a mounting system for a gas turbine engine auxiliary component that can effectively and reliably withstand a shock load from a fan-blade out event.

SUMMARY OF THE DISCLOSURE

According to one embodiment of the present disclosure, a mount for mounting a component to a gas turbine engine is disclosed. The mount may comprise a central portion that attaches to the component, and a flange circumscribing the central portion and extending to the gas turbine engine, the flange including a fusible region that breaks at a predetermined load.

In a refinement, the fusible region may be of a reduced thickness than a thickness of a rest of the flange.

In another refinement, the fusible region may be a continuous region around an entire perimeter of the flange.

In another refinement, the flange may include disconnected fusible regions around a perimeter of the flange.

In another refinement, the predetermined load may be between an inclusive range of twenty (20) to one hundred (100) times the weight of the component.

In another refinement, the mount may further comprise a retention element that retains the component to the gas turbine engine.

In another refinement, the retention element may be a strap positioned over the component and around a circumference of the gas turbine engine.

In another refinement, the fusible region may be a fusible link having reduced stiffness than a rest of the flange, and the retention element may include two retention flanges that engage with each other when the fusible link breaks, the fusible link positioned between the two retention flanges.

In another refinement, the two retention flanges may be generally "L"-shaped.

In another refinement, the central portion may be centrally located within the mount and include pins for receiving bolts.

In yet another refinement, the flange may extend around a perimeter of the central portion from an upper section of the central portion to an outer surface of a casing of the gas turbine engine.

According to another embodiment of the present disclosure, a gas turbine engine is disclosed. The gas turbine engine may comprise a fan section, a compressor section downstream of the fan section, a combustor section downstream of the compressor section, a turbine section downstream of the combustor section, and a casing enclosing the fan section, the compressor section, the combustor section, and the turbine section. The casing may include a mount disposed on an outer surface of the casing and attached to a component. The mount may include a fusible region that breaks at a predetermined load to isolate the component from the predetermined load.

In a refinement, the mount may be located on the casing in a fan containment zone enclosing the fan section.

In another refinement, the mount may be integral to the engine casing.

In another refinement, the mount may include a central portion for attachment to the component, and a flange integrally extending from an outer surface of the engine casing to the central portion, the fusible region located on the flange.

In another refinement, the mount may be bonded to the engine casing.

In yet another refinement, the mount may include a central portion for attachment to the component, and a flange including the fusible region and extending from the central portion to an outer surface of the engine casing, the flange having a surface bonded to an outer surface of the engine casing.

According to yet another exemplary embodiment of the present disclosure, a method for protecting a component mounted to a gas turbine engine is disclosed. The method may comprise attaching a mount to a casing of the gas turbine engine, the mount including a fusible region that breaks at a predetermined load. The method may further comprise attaching the component to the mount. The method may further comprise the fusible region breaking when the mount experiences the predetermined load, detaching the component from the casing of the gas turbine engine.

In a refinement, the method may further comprise using a retention element to retain the component to the casing after the fusible region breaks.

In a related refinement, the method may further comprising the retention element restricting free motion of the component while preventing energy transmission from the casing to the component.

These and other aspects and features of the disclosure will become more readily apparent upon reading the following detailed description when taken in conjunction with the accompanying drawings. Although various features are disclosed in relation to specific exemplary embodiments of the invention, it is understood that the various features may be combined with each other, or used alone, with any of the various exemplary embodiments of the invention without departing from the scope of the invention.

While the present disclosure is susceptible to various modifications and alternative constructions, certain illustrative embodiments thereof, will be shown and described below in detail. The invention is not limited to the specific embodiments disclosed, and includes all modifications, alternative constructions, and equivalents thereof.

DETAILED DESCRIPTION

Figure 1:
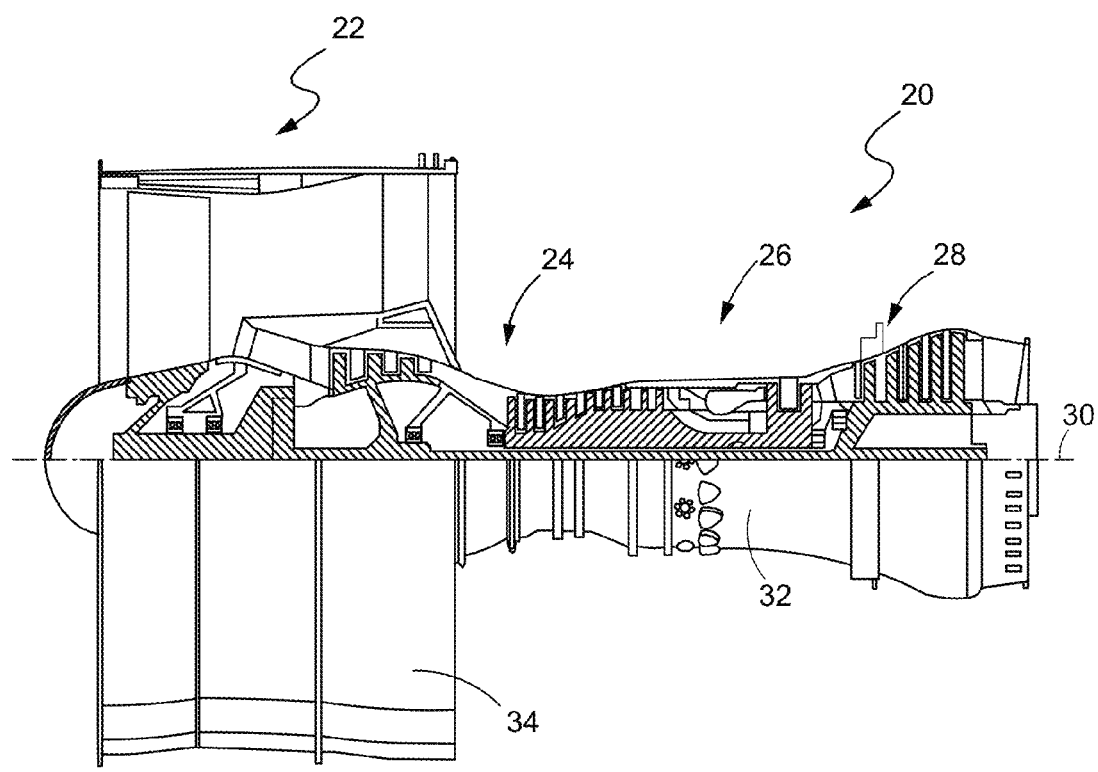
FIG. 1 is a schematic cross-sectional view of a gas turbine engine according to one embodiment of the present disclosure.

Referring now to the drawings, and with specific reference to FIG. 1, in accordance with the teachings of the disclosure, an exemplary gas turbine engine 20 is shown. The gas turbine engine 20 may generally comprise a fan section 22 which draws ambient air into the engine 20, a compressor section 24 where the air is pressurized, a combustion section 26 which mixes and ignites the compressed air with fuel generating hot combustion gases, and a turbine section 28 for extracting power from the hot combustion gases. The compressor and turbine sections 24, 28 may each contain one or more stages of a compressor and a turbine which rotate about an engine longitudinal axis 30. The fan section 22, compressor section 24, combustion section 26, and turbine section 28 of the gas turbine engine 20 may be circumscribed by a generally cylindrical engine casing 32. The engine casing 32 may serve as a main structural support for the gas turbine engine 20.

Figure 2:
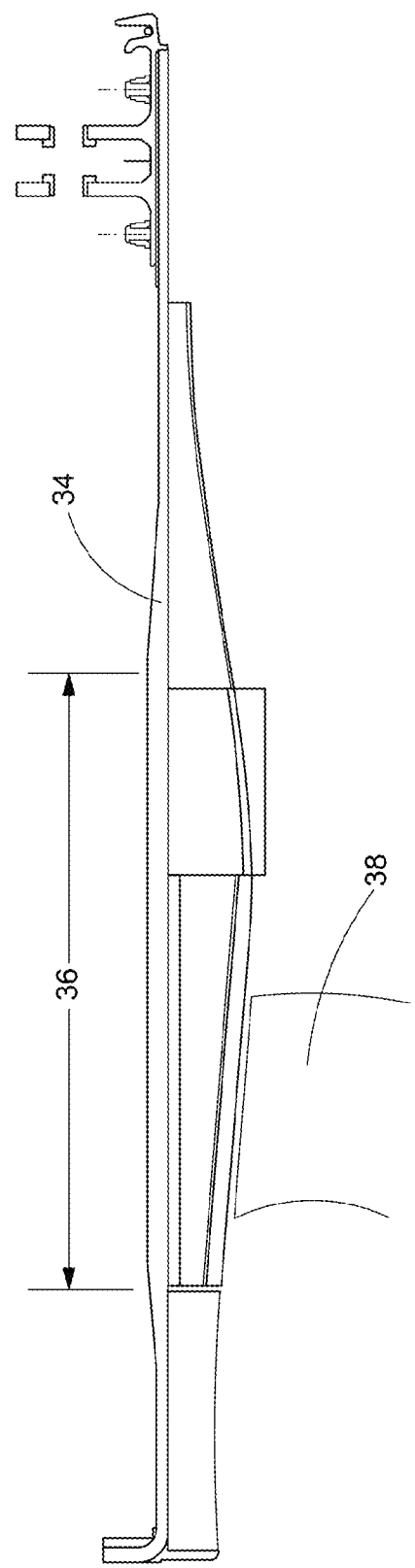
FIG. 2 is a cross-sectional view of part of a fan case of the gas turbine engine of FIG. 1.
Figure 3:
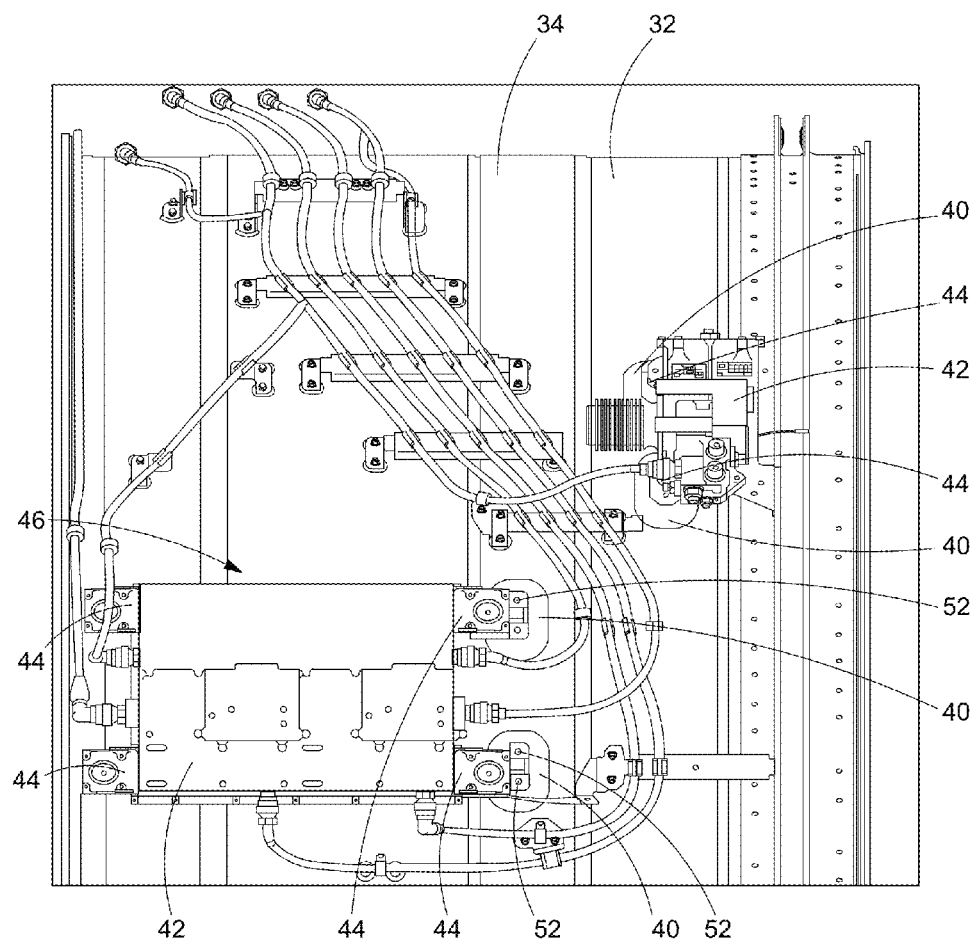
FIG. 3 is a perspective view of a component mounted to a fan case of the gas turbine engine of FIG. 1.

The engine casing 32 may include a fan casing 34 which may enclose the fan section 22. As shown best in FIG. 2, the fan casing 34 may have a fan containment zone 36. In the event a fan blade 38, or a portion of the fan blade 38, becomes separated from the engine rotor body (not shown), the fan blade 38 is expected to strike the fan casing 34 at a location in the fan containment zone 36.

Referring now to FIGS. 3-6, at least one mount 40 may be used for mounting one or more auxiliary or external components 42 to the engine casing 32, such as to the fan casing 34 in the fan containment zone 36. Mounts 40 may certainly be used in other locations of the engine casing 32 as well. Mounts 40 may be used for mounting components 42, such as electrical boxes, engine oil tanks, gearboxes, valves, control systems for regulating the engine's operations, or other components. The components 42 may be directly attached to the mount 40, or via a bracket 44. More specifically, the components 42 may have or be attached to the bracket 44, which are then attached to the mount 40.

Figure 5:
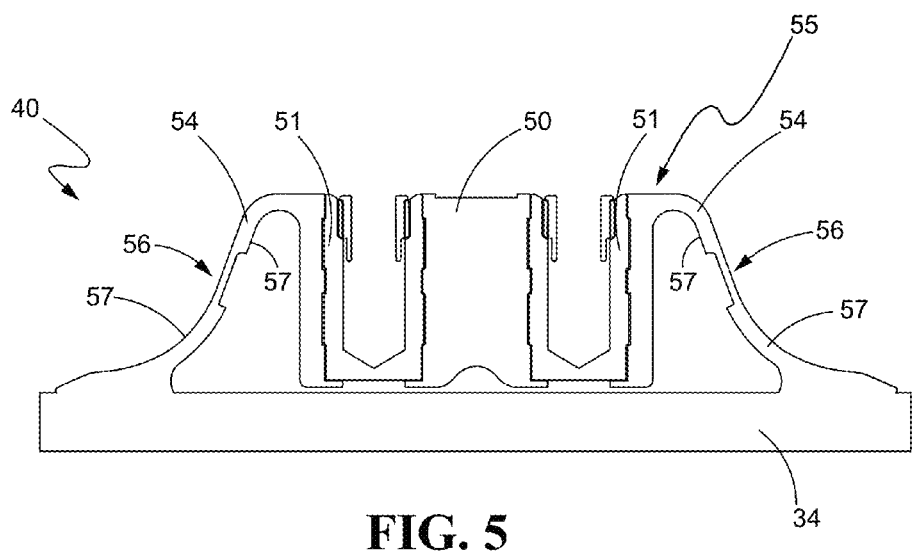
FIG. 5 is a cross-sectional view of the mount of FIG. 4.
Figure 6:
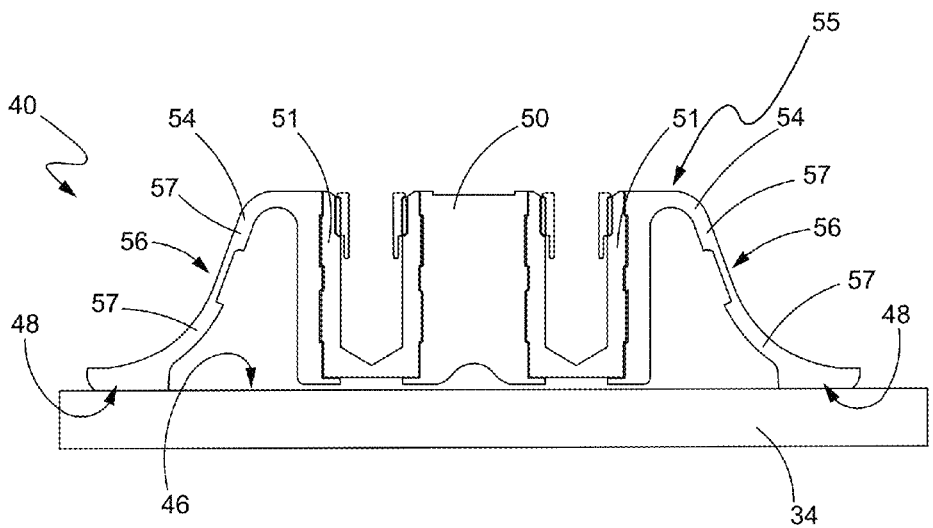
FIG. 6 is a cross-sectional view of a mount according to another embodiment of the present disclosure.

The mount 40 may be integral to the fan casing 34, as shown best in FIG. 5. For example, the mount 40 may be machined when the fan casing 34 is initially forged. Alternatively, as shown best in FIG. 6, the mount 40 may be manufactured separately and subsequently bonded to an outer surface 46 of the fan casing 34.

The mount 40 may comprise a central portion 50 and at least one flange 54. The central portion 50 may be configured to attach the component 42 or bracket 44 onto the mount 40. For example, the central portion 50 may have pins 51 for receiving bolts 52, or other suitable means of attachment. The central portion 50 may be centrally located within the mount 40 and may have a generally rectangular solid shape, although other configurations are certainly possible. The central portion 50 is not bonded, attached, or integral to the outer surface 46 of the fan casing 34.

The flange 54 may comprise a generally planar segment circumscribing the central portion 50. From an upper section 55 of the central portion 50, the flange 54 extends down to the outer surface 46 of the fan casing 34. The flange 54 may surround a perimeter of the central portion 50 or mount 40, although other configurations are certainly possible. The flange 54 may facilitate attachment of the mount 40 to the fan casing 34.

For example, in the embodiment of FIG. 5, wherein the mount 40 is integral to the fan casing 34, the flange 54 may integrally extend from the outer surface 46 of the fan casing 34 to the central portion 50. Alternatively, in the embodiment of FIG. 6, wherein the mount 40 is separately manufactured, the flange 54 may be configured to attach the mount 40 to the outer surface 46 of the fan casing 34. For example, the flange 54 may have a surface 48 for bonding to the outer surface 46 of the fan casing 34. An adhesive (e.g., epoxy) or other suitable bonding agent may be applied to the surface 48 of the flange 54 for attaching the mount 40 to the outer surface 46 of the fan casing 34. Other means of attachment than bonding, such as, without limitation, bolting, welding, or the like, may also be used to attach the flange 54 to the fan casing 34.

The flange 54 may include at least one fusible region 56 configured to break when the mount 40 is subject to a predetermined load, force, acceleration, energy or impact. For example, the predetermined load of the fusible region 56 may be greater than a maximum maneuver load of the gas turbine engine 20, such as, but not included to, twenty (20) times the weight of the component 42 (or 20 G multiplied by the mass of the component 42), thereby allowing for the mount 40 to withstand maximum engine maneuver load conditions. The predetermined load may also be less than an impact load of a fan-blade out event, such as, for example, one hundred (100) times the weight of the component 42 (or 100 G multiplied by the mass of the component 42). Thus, as an example, the predetermined load may be between an inclusive range of twenty (20) to one hundred (100) times the weight of the component 42. The predetermined load may certainly be less than twenty (20) times the weight of the component 42 or greater than one hundred (100) times the weight of the component 42, as well.

When the mount 40 experiences a load greater than the maximum engine maneuver load and less than or equal to the impact load of a fan-blade out event, the fusible region 56 of the mount 40 breaks. When the fusible region 56 breaks the flange 54, the central portion 50 of the mount 40 detaches from the fan casing 34, thereby stopping a transfer of the impact load to the component 42. Thus, the fusible region 56 of the flange 54 discontinues a transfer of the predetermined load from the fan casing 34 to the component 42. In so doing, the mount 40 prevents damage to the component 42 during the fan-blade out event. Other values than twenty (20) times the weight of the component 42 for the maximum engine maneuver load are certainly possible. In addition, other values than one hundred (100) times the weight of the component 42 for the impact load are certainly possible.

The fusible region 56 may be comprised of frangible or deformable material having a variable stiffness as a rest 57 of the flange 54. For example, as shown best in FIGS. 5 & 6, the fusible region 56 may be comprised of a same material as the flange 54 and may have a reduced thickness than a thickness of the rest 57 of the flange 54. The fusible region 56 may be one-half (½) to two-thirds (⅔) of the thickness of the rest 57 of the flange 54 adjacent to the fusible region 56, although other thicknesses are certainly possible. As an example, the thickness of the rest 57 of the flange 54 may be 3.0 mm, while the reduced thickness of the fusible region 56 may be between 1.5 mm to 2.0 mm. In other embodiments, the fusible region 56 may be composed of a different material and a same thickness as the rest of the flange 54, such as, a material composition having reduced durability, resilience, or strength than a composition of the rest of the flange 54. At the predetermined load, the fusible region 56 breaks, while the rest of the flange 54 does not.

Figure 4:
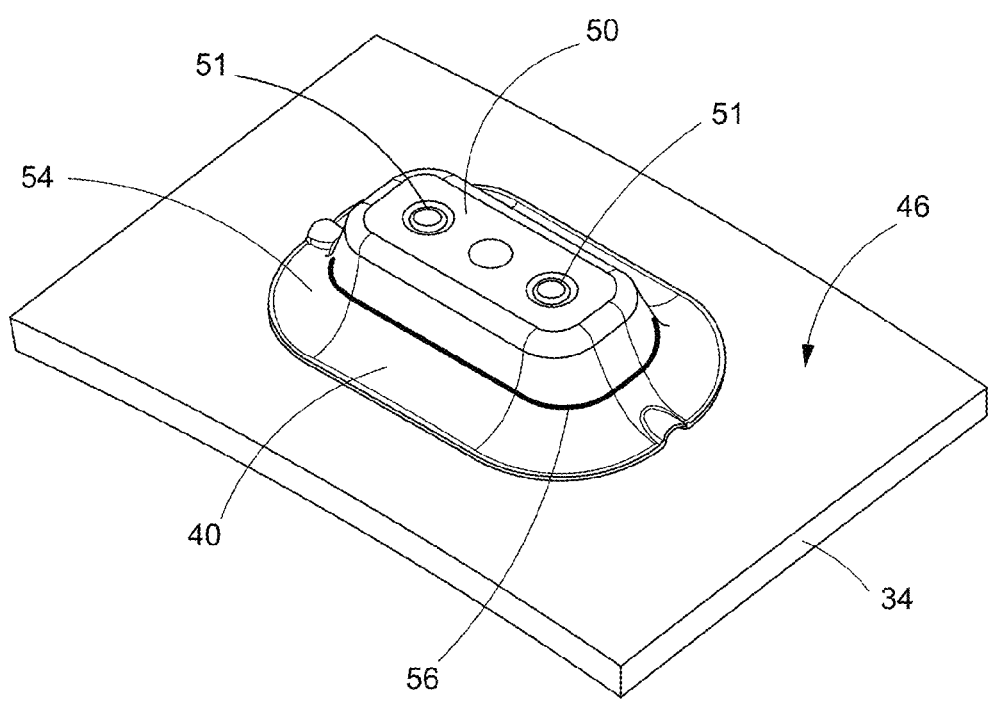
FIG. 4 is a perspective view of a mount used to mount the component to the fan case of FIG. 3.
Figure 7:
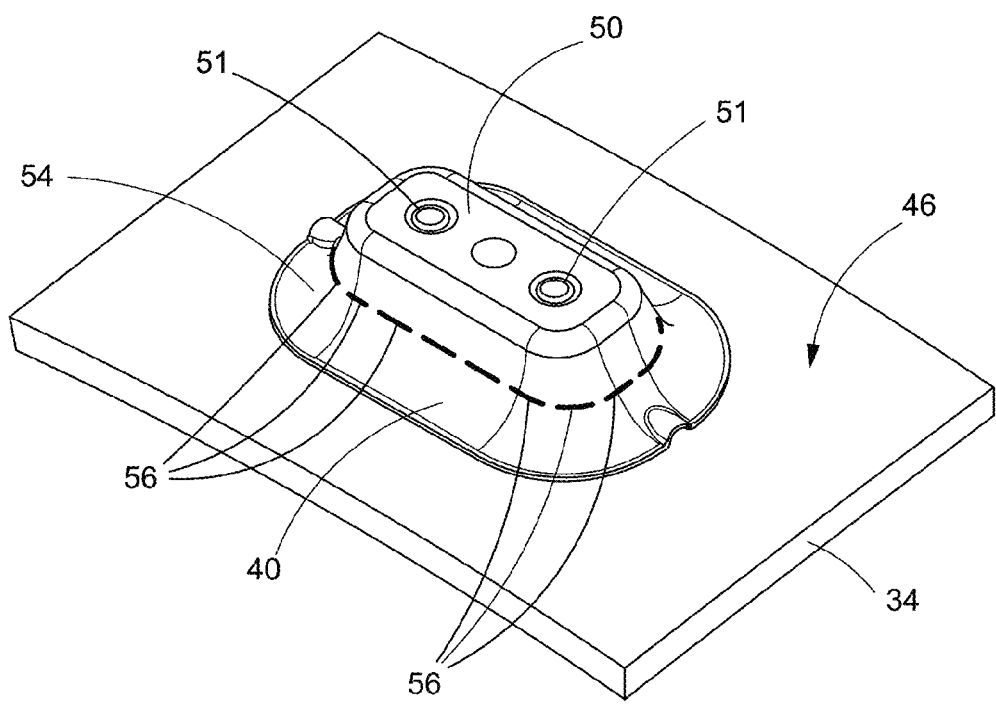
FIG. 7 is a perspective view of a mount according to another embodiment of the present disclosure.

The fusible region 56 may comprise a continuous region around an entire length or at least part of a perimeter of the flange 54, as shown best in FIG. 4. Alternatively, as shown best in FIG. 7, the flange 54 may have disconnected fusible regions 56 around the perimeter of the flange 54. Other configurations than that depicted in FIGS. 4 & 7 are certainly possible.

Figure 8:
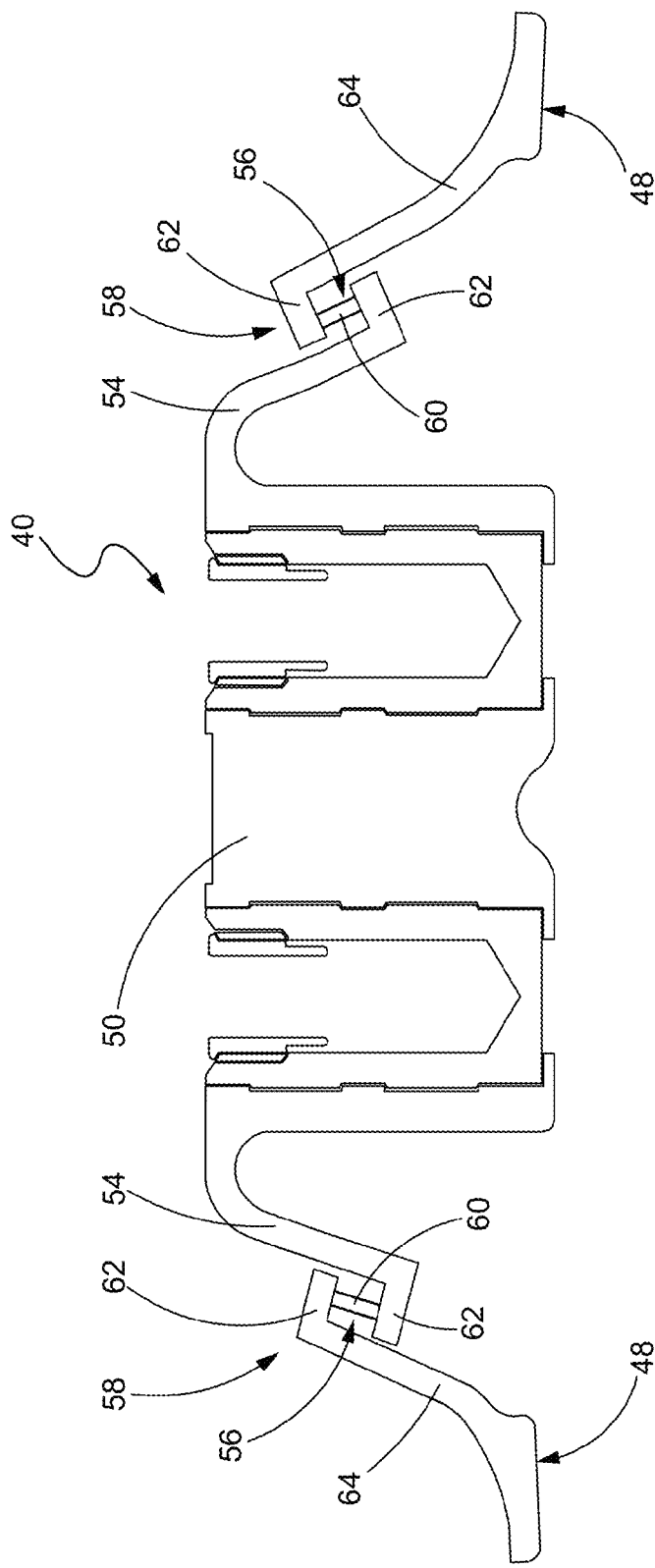
FIG. 8 is a cross-sectional view of a mount according to another embodiment of the present disclosure.
Figure 9:
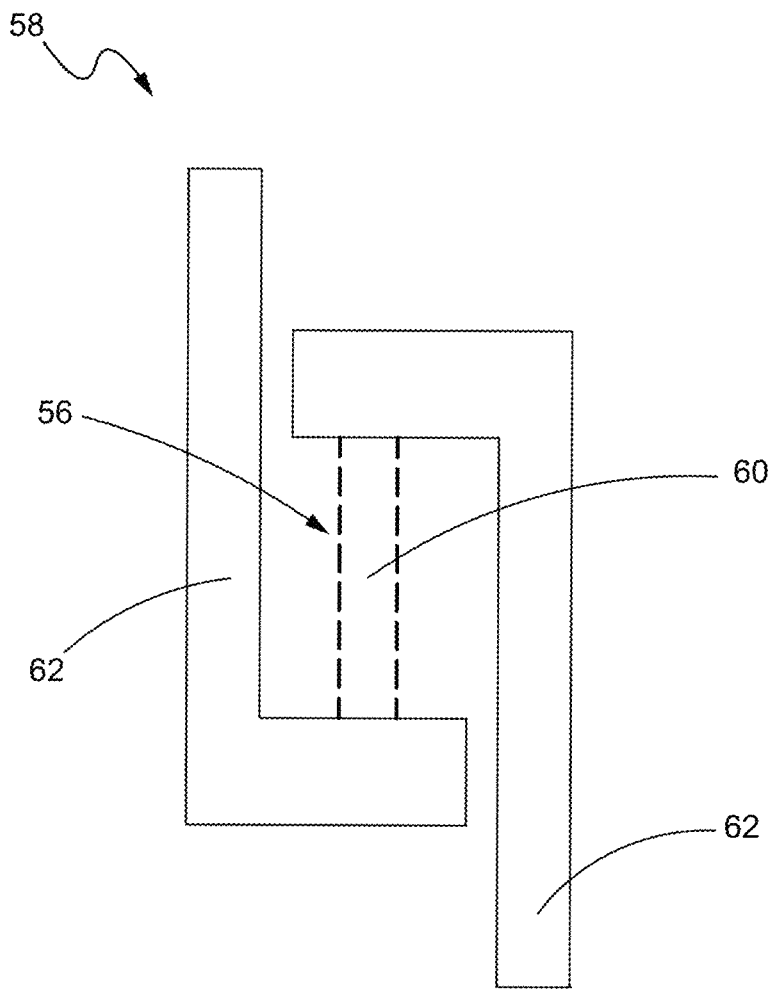
FIG. 9 is a cross-sectional view of a retention element of the mount of FIG. 8.

Referring now to FIGS. 8 & 9, the mount 40 may also have a retention element 58 configured to retain the component 42 to the fan casing 34 after the fusible region 56 breaks. With the retention element 58, the mount 40 may restrict free motion of the component 42, while still preventing energy transmission from the fan casing 34 to the component 42. For example, the fusible region 56 may comprise a fusible link 60, the retention element 58 may comprise two retention flanges 62, and the fusible link 60 may be positioned between the two retention flanges 62. Configured to break at the predetermined load, the fusible link 60 may be of reduced thickness than the rest of the flange 54, or may be composed of weaker material than the rest of the flange. Formed as part of the flange 54, retention flanges 62 may be configured to engage with each other after the fusible link 60 breaks. For example, retention flanges 62 may be generally "L"-shaped. Retention flanges 62 may maintain a connection of the central portion 50 to a section 64 of the flange 54 that is integral to the fan casing 34 or has a surface 48 bonded to the fan casing 34.

Figure 10:
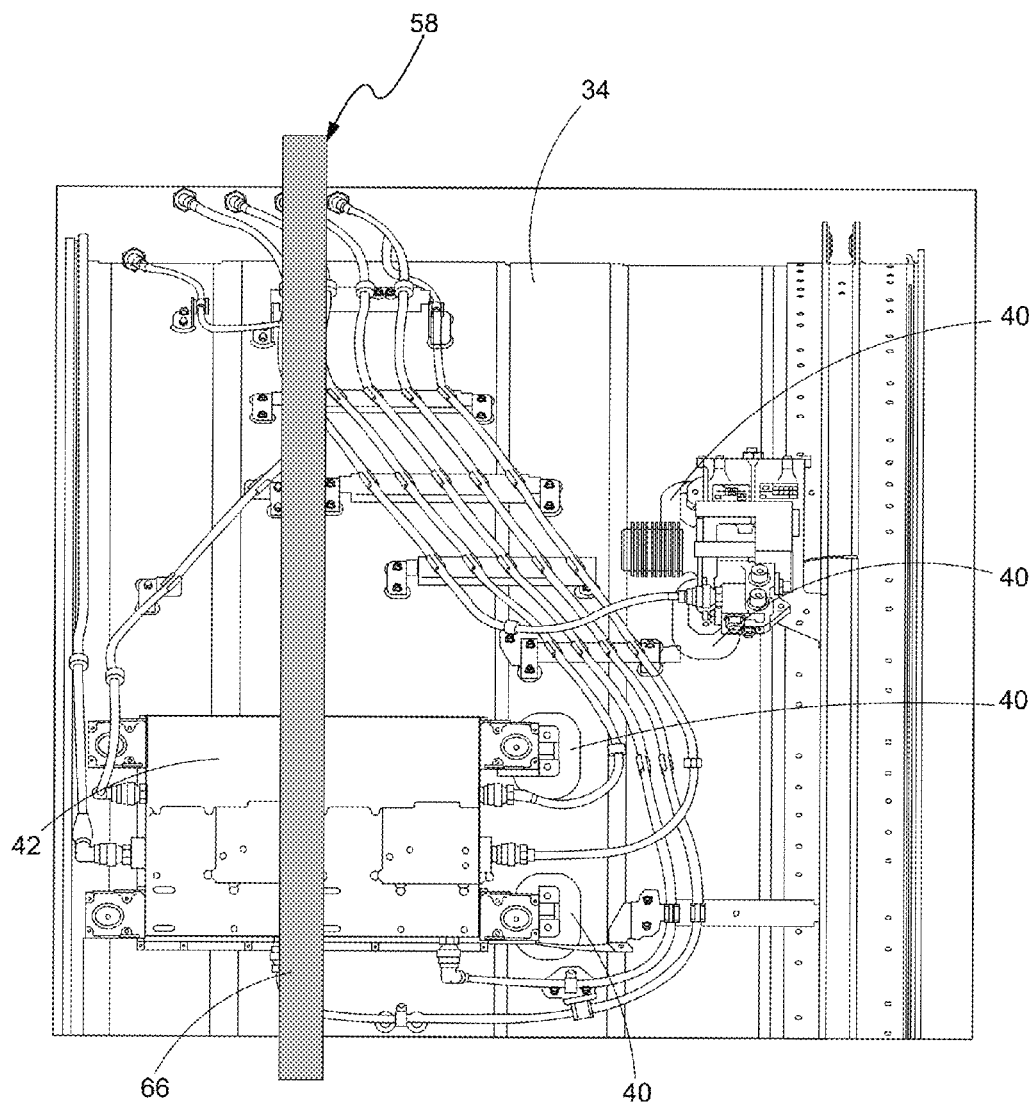
FIG. 10 is a perspective view of a retention element according to another embodiment of the present disclosure.

It will be understood that the retention element 58 may comprise other designs, such as retention flanges having a hooking arrangement, without departing from the scope of the present disclosure. Furthermore, the retention element 58 may be external to the mount 40 as well. For example, as shown in FIG. 10, the retention element 58 may comprise a strap 66, such as a lanyard attachment or other suitable material, positioned over the component 42 and around a circumference of the fan casing 34 or engine casing 32. When the fusible region 56 of the mount 40 breaks during a fan-blade out event, the strap 66 holds the component 42 to the fan casing 34, thereby restricting free motion of the component 42.

Figure 11:
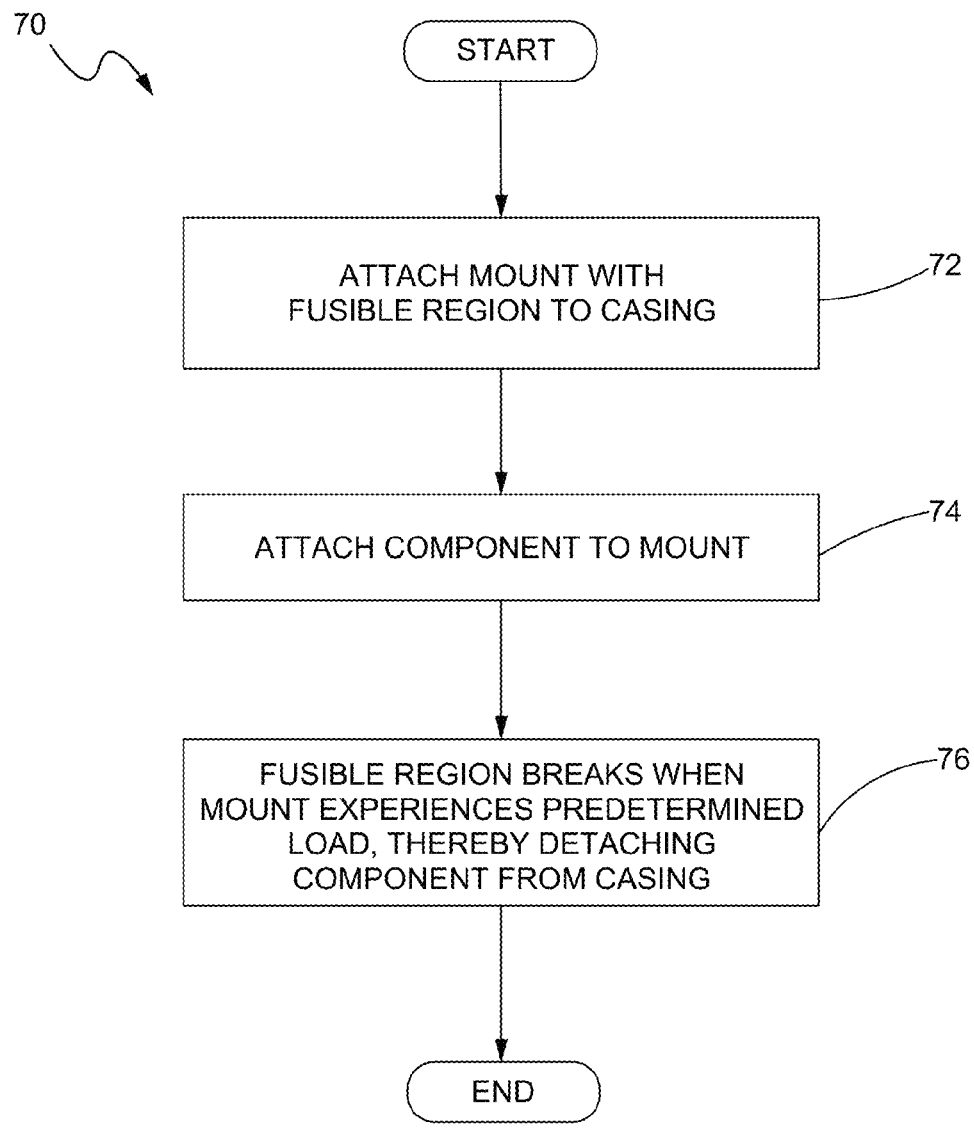
FIG. 11 is a flowchart illustrating an exemplary process for protecting a component mounted to a gas turbine engine, according to yet another embodiment of the present disclosure.

Referring now to the flowchart of FIG. 11, with continued reference to FIGS. 1-10, an exemplary process 70 for protecting a component 42 mounted to a gas turbine engine 20 is shown. At block 72, the mount 40 is attached to the casing 32 of the gas turbine engine 20, the mount 40 including a fusible region 56 that breaks at a predetermined load. The component 42 is attached to the mount 40 at block 74. At block 76, the fusible region 56 breaks when the mount 40 experiences the predetermined load, thereby detaching the component 42 from the casing 32 of the gas turbine engine 20. It is to be understood that blocks 72-76 may be performed in a different order than that shown in FIG. 11. For example, the component 42 may be attached to the mount 40 before the mount 40 is attached to the casing 32 of the gas turbine engine 20.

INDUSTRIAL APPLICABILITY

From the foregoing, it can be seen that the teachings of this disclosure can find industrial application in any number of different situations, including but not limited to, gas turbine engines. Such engines may be used, for example, on aircraft for generating thrust, or in land, marine, or aircraft applications for generating power.

The described disclosure provides an effective and reliable mount for a gas turbine engine auxiliary component that can withstand a shock load from a fan-blade out event. By providing the mount with a fusible region, the shock load is not transferred to the component, thereby isolating the component from damage. Furthermore, by providing a controlled or predetermined break point of the fusible region, the mounting member can safely react to all engine maneuver loads and maintain structural capability, while preventing the transfer of a predetermined load that may cause damage to the auxiliary component. Moreover, the retention element of the present disclosure prevents excessive deflection of the auxiliary component after the fusible region breaks.

While the foregoing detailed description has been given and provided with respect to certain specific embodiments, it is to be understood that the scope of the disclosure should not be limited to such embodiments, but that the same are provided simply for enablement and best mode purposes. The breadth and spirit of the present disclosure is broader than the embodiments specifically disclosed and includes all embodiments and equivalents encompassed within the claims appended hereto.

What is claimed is:

1. A mount for mounting a component to a gas turbine engine, comprising:
    a central portion that attaches to the component;
    a retention element for retaining the component to the gas turbine engine; and a flange circumscribing the central portion and extending to the gas turbine engine, the flange including a fusible region that breaks at a predetermined load;

wherein the fusible region is a fusible link having reduced stiffness than a rest of the flange, and wherein the retention element includes two retention flanges configured to engage with each other when the fusible link breaks, the fusible link positioned between the two retention flanges.

2. The mount of claim 1, wherein the fusible region is of a reduced thickness than a thickness of a rest of the flange.

3. The mount of claim 1, wherein the fusible region is a continuous region around an entire perimeter of the flange.

4. The mount of claim 1, wherein the flange includes disconnected fusible regions around a perimeter of the flange.

5. The mount of claim 1, wherein the predetermined load is between an inclusive range of twenty (20) to one hundred (100) times the weight of the component.

6. The mount of claim 1, wherein the two retention flanges are genereally "L"—shaped.

7. The monut of claim 1, wherein the central portion is centrally located within the mount and includes pins for receiving bolts.

8. The mount of claim 7, wherein the flange extends around a perimeter of the central portion from an upper section of the central portion to an outer surface of a casing of the gas turbine engine.

9. A gas turbine engine, comprising:
a fan section;
a compressor section downstream of the fan section;
a combustor section downstream of the compressor section;
a turbine section downstream of the combustor section; and
a casing enclosing at least one of the fan section, the compressor section, the combustor section, and the turbine section, the casing including
a mount disposed on an outer surface of the casing and attached to a component, the mount including:
a central portion that attaches to the component;
a retention element for retaining the component to the casing; and
a flange circumscribing the central portion and extending to the casing, the flange including a fusible region that breaks at a predetermined load;
wherein the fusible region is a fusible link having reduced stiffness than a rest of the flange, and wherein the retention element includes two retention flanges configured to engage with each other when the fusible link breaks, the fusible link positioned between the two retention flanges.

10. The gas turbine engine of claim 9, wherein the mount is located on the casing in a fan containment zone enclosing the fan section.

11. The gas turbine engine of claim 9, wherein the mount is integral to the casing.

12. The gas turbine engine of claim 9, wherein the mount is bonded to the casing.

13. The gas turbine of claim 12, wherein the flange has a surface bonded to an outer surface of the engine casing.

14. A method for protecting a component mounted to a gas turbine, comprising:
attaching a mount to a casing of the gas turbine engine, the mount including:
a central portion that attaches to the component;
a retention element for retaining the component to the casing; and
a flange circumscribing the central portion and extending to the casing, the flange including a fusible region that breaks at a predetermined load;
wherein the fusible region is a fusible link having reduced stiffness than a rest of the flange, and wherein the retention element includes two retention flanges configured to engage with each other when the fusible link breaks, the fusible link positioned between the two retention flanges;
attaching the component to the mount; and
the fusible region breaking when the mount experiences the predetermined load, detaching the component from the casing of the gas turbine engine.

15. The method of claim 14, further comprising retaining the component to the casing via the retention element after the fusible region breaks.

16. The method of claim 15, further comprising the retention element restricting free motion of the component while preventing energy transmission from the casing to the component.

* * * * *